United States Patent [19]
Powell

[11] 3,991,368
[45] Nov. 9, 1976

[54] DIRECT READING DIGITAL SPEEDOMETER

[76] Inventor: Dallas L. Powell, 268 Pompano St., Waveland, Miss. 39576

[22] Filed: Jan. 9, 1975

[21] Appl. No.: 539,849

Related U.S. Application Data

[63] Continuation of Ser. No. 413,094, Nov. 5, 1973, abandoned.

[52] U.S. Cl. .......................... 324/166; 235/92 FQ; 235/92 TF
[51] Int. Cl.² ...................... G01P 3/48; G01P 3/54
[58] Field of Search .......... 324/166, 173, 174, 175, 324/78 R, 78 D; 235/92 TF, 92 FQ; 340/263

[56] References Cited
UNITED STATES PATENTS

| | | | |
|---|---|---|---|
| 3,578,960 | 5/1971 | Georgi et al. ...................... | 235/156 |
| 3,614,617 | 10/1971 | Blake, Jr. ............................ | 324/166 |
| 3,639,753 | 2/1972 | Reich ............................... | 246/182 C |
| 3,704,445 | 11/1972 | Lanham .............................. | 340/62 |
| 3,786,336 | 1/1974 | Lohr .................................. | 322/51 |
| 3,824,385 | 7/1974 | Kiencke ............................ | 235/150.3 |

Primary Examiner—Robert Segal
Assistant Examiner—Vincent J. Sunderdick
Attorney, Agent, or Firm—Arthur M. Dula; Murray Robinson; Ned L. Conley

[57] ABSTRACT

A disk rotatably connected to an associated vehicle's speedometer cable has a plurality of holes evenly spaced around its circumference. The number of holes is a function of the number of revolutions the speedometer cable makes in a given distance traveled by the vehicle. The holes allow a beam of light to fall on a phototransistor. The phototransistor generates electrical pulses per unit time numerically proportional to the angular velocity of the disk and thus to the speed of the vehicle. The function relating the number of holes on the disk to the number of revolutions made by the speedometer cable per a given distance is chosen to make the number of pulses generated per a given time equal to or an integral multiple of the speed of the vehicle expressed in some standard system of speed measurement. Logic circuits divide the output pulses by said multiple and store the resulting number. This stored number is then directly displayed and is equal to the speed of the vehicle in terms of the standard system.

2 Claims, 3 Drawing Figures

DIRECT READING DIGITAL SPEEDOMETER

This is a continuation of application Ser. No. 413,094 filed Nov. 5, 1973 now abandoned.

The invention relates generally to an apparatus for measuring the speed of a vehicle, and more specifically to display of the vehicle's speed in digital form in terms of a standardized system of speed measurement.

In the past digital speedometers have measured periodic events that varied in rate with the vehicle's speed. These events were converted to electrical pulses by sensors and accumulated by counters as arbitrary numbers. It was necessary to compare these pulses or the resulting counted number with some external reference, such as a reference oscillator or time base, and to use specially constructed gating circuits to change the arbitrary stored number to a number equal to the vehicle's speed in a standard system of speed measurement.

It is an object of the invention to provide a digital speedometer that does not require external reference oscillators or time bases for conversion to display the velocity of a vehicle in terms of a standard system of speed measurement.

It is another object of the invention to provide a digital speedometer that does not require the use of any special gating circuits and whose parts are all standard off-the-shelf items.

Still a further object of the invention is to provide a digital speedometer that is simple to install in any existing vehicle without special knowledge of the art.

Yet another object of the invention is to provide a digital speedometer that is simple and inexpensive to build and which requires no external calibration.

Other objects and a fuller understanding of the invention may be had by referring to the following description, drawings and claims in which:

Figure 1:
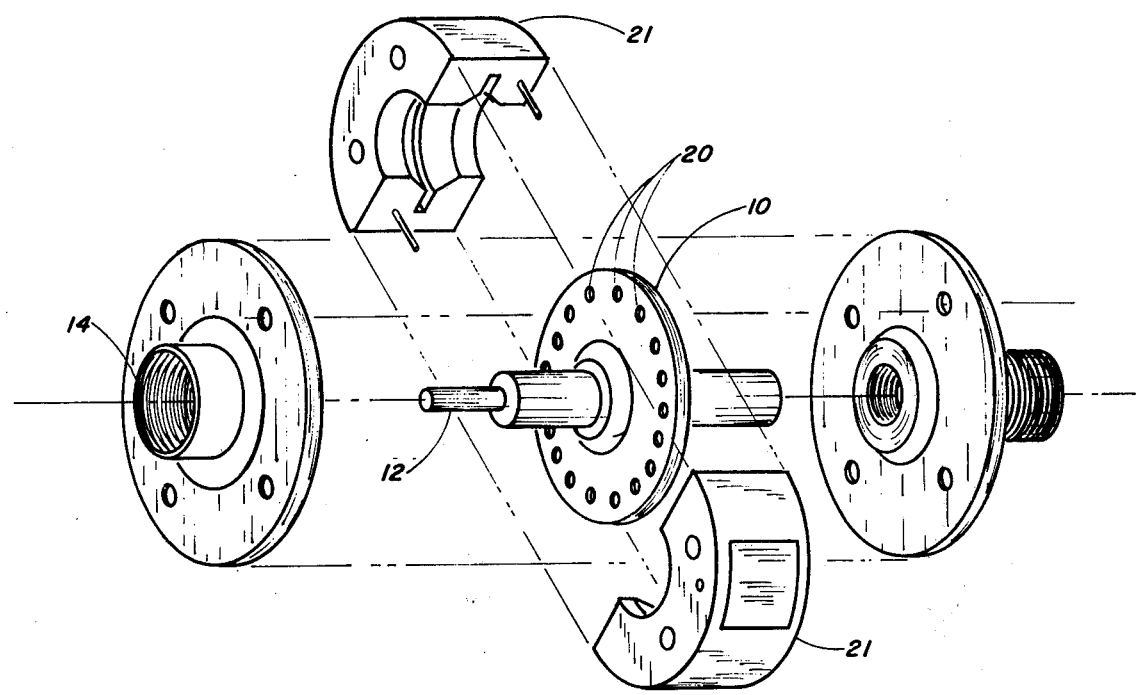
FIG. 1 is a diagrammatic view of a species of sensing unit.
Figure 2:
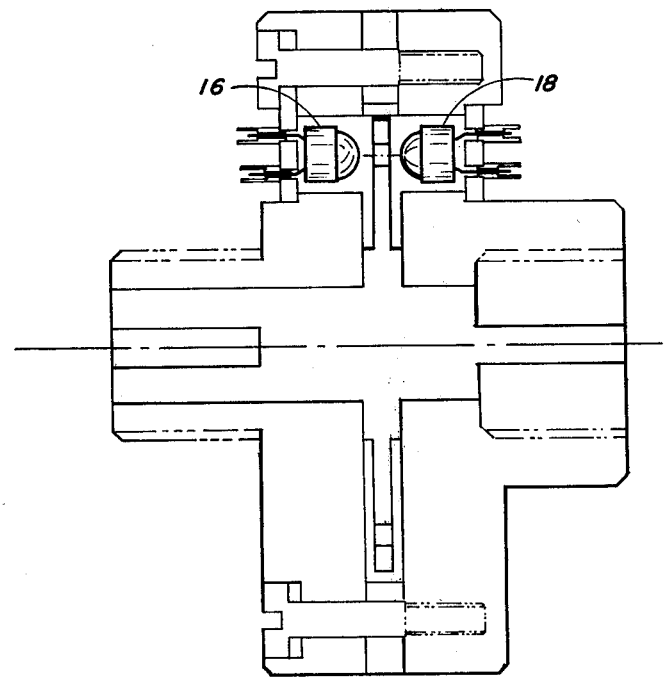
FIG. 2 is an electrical schematic of the sensor.

Referring now to FIGS. 1 and 2 in which sensor disk 10 is rotatably mounted with shaft 12 which engages the vehicle's speedometer cable 14. Light source 16 (shown in FIG. 2) is mounted opposite phototransistor 18 (shown in FIG. 2) such that the holes 20, evenly spaced around the sensor disk, allow light from the light source to periodically fall on the phototransistor 18 as the disk rotates between them. The entire unit is sealed in case 21 to keep out dirt and dust and to ensure continued proper alignment of the light source and the phototransistor.

Referring now to FIG. 2 which is a schematic diagram of the sensor, light source 16 may be any suitable indicator lamp or it can be a light emitting diode that produces sufficient light to trigger the phototransistor. The phototransistor may be any phototransistor having a rise and fall time of 500 micro seconds or less. The light source and phototransistor are connected to a regulated power supply that is not illustrated. The other lead from the lamp is grounded and the emitter of the phototransistor is connected to the invention's counting circuits illustrated by FIG. 3.

The sensor disk rotates between the light source and the phototransistor causing light to fall on the phototransistor when a hole in the disk is between the two. This causes the phototransistor to pass electrical pulses. It passes them at a rate directly proportional to the number of holes in the disk and to the speed of the disk's rotation. Since the disk is attached directly to the vehicle's speedometer cable, its speed of rotation will be a direct function of the speed of the vehicle.

Most vehicles have speedometers with a speedometer cable ratio of 1000 to one. This means that the speedometer cable turns through 1000 revolutions for each mile traveled by the vehicle (The invention, however, will work with any speedometer cable ratio). If the speedometer cable turns 1000 times while the vehicle travels one mile, then one turn of the cable requires that the vehicle move 5.280 feet (one mile = 5,280 feet). If the cable turns this 1000 revolutions in one minute, then the vehicle has traveled one mile in the minute and its speed is 60 miles per hour.

Given these relationships it is possible to calculate the number of holes that must be evenly spaced around the sensor disk to cause the number of output pulses generated in a given repeating time period, for example one second, at a given speed to be numerically equal to, or an integral multiple of the speed of the vehicle as expressed in miles per hour. This is possible because the sensor disk rotates through 360° in each revolution. Thus when the disk makes 1000 revolutions per mile the sensor disk rotates through 360,000° for each mile the vehicle travels. If the vehicle travels one mile in one hour the disk will rotate through 360,000 in that hour or an average of 100° per second (one hour = 3600 seconds). The largest number that will divide evenly into both 360° (the sensor disk) and the 100° of rotation that takes place in one second is 20. 20° goes into 360° 18 times. Thus eighteen holes spaced 20° apart will subtend equal angles around the disk. It is necessary that the number of degrees between the holes on the sensor disk be equal and evenly divisable into both 360 and the number of degrees the sensor disk rotates through in one second at one mile per hour so the logic circuits of the invention will be able to determine the speed of the vehicle in miles per hour by dividing the pulses generated by the phototransistor by an integer.

Since one mile per hour of the vehicle is equal to 100° of disk revolution per second and the holes on the sensor disk are placed 20° apart, one mile per hour of vehicle speed will cause the phototransistor 18 to generate five pulses per second. This is five times the speed of the vehicle expressed in miles per hour. In this example the repeating time period is one second. The invention is flexible and is not limited to any given repeating time period or system of speed measurement. It is only necessary to know the number of degrees that the sensor disk rotates during the desired sampling period while the vehicle is traveling at a known speed. The general equation for a vehicle traveling one unit of distance (mile, kilometer, etc.) per hour is as follows:

| Speedometer cable ratio | Degrees of rotation of the speedometer shaft |
|---|---|
| 10 | one second | where the speedometer cable ratio is the number of complete revolutions made by the speedometer cable while the vehicle travels a given distance.

Any method may be used for sensing this rotation as long as every 20° of speedometer shaft rotation generates an electrical pulse. One example of this would be a piezoelectric crystal being struck by a regular 18 sided cam attached to the speedometer cable.

Figure 3:
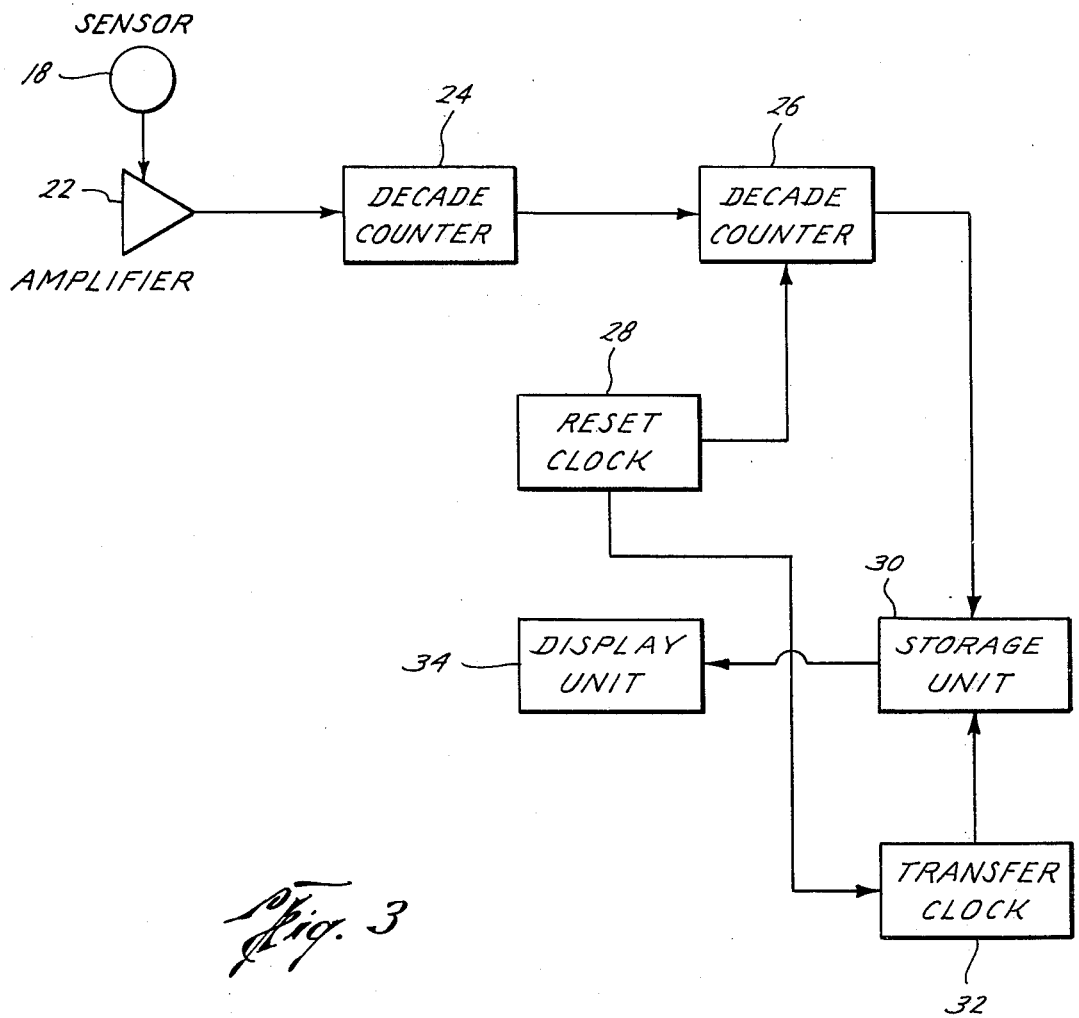
FIG. 3 is a functional block diagram of the counter and display units of the invention.

Referring now to FIG. 3, which is a functional block diagram of the logic, counting and display units of the invention, in which pulses of electric current from phototransistor 18 are amplified by transistor 22 which is a 2N2222 or equivalent. The pulses are then divided by division unit 24 which is a decade counter, a Texas Instruments SN 7490 or equivalent. A decade counter is a device that sets the state of electrical switches known as "flip-flops" within it as it receives incoming pulses of electricity. Its outputs are sequentially activated as one through nine pulses are received. For the purpose of the invention it is only important that the decade counter has a specific output that is activated only by every fifth pulse it receives. Thus if 100 pulses are introduced to this division unit, it will pass 20 pulses; if 1000 are put in, 200 come out, etc. The divided output from the division unit is the input to counting unit 26, which consists of two decade counters like the division unit. These counters and the division unit are reset to a count of zero once per second by clock 28 which is a signetics SE 555 or equivalent. The operating cycle of the circuit is as follows: pulses are generated by the rotation of the sensor disk across the phototransistor at the rate of five pulses per second for each mile per hour that the vehicle is traveling. The division unit divides this pulse train by five yielding an output of one pulse per second for each one mile per hour of vehicle speed. These pulses are then counted for one second by the counting unit. It should be clear that at the end of the one second period the number stored in the counting unit is equal to the speed of the vehicle in miles per hour.

During the last ten microseconds of each second the number accumulated in the counting unit is transfered to the data storage unit 30, which are two Texas Instruments SN 7475 quad bistable latches, on the signal of clock unit 32 (also a SE 555). The data storage unit holds the number counted by the counting unit for display by display unit 34 which is two seven segment LED digital readouts or equivalent. The invention as described is configured to display vehicle speeds from one to 99 miles per hour. Higher speeds can be displayed by adding additional counting and display units. The invention requires a source of five volt regulated power for the sensor and logic electronics. This is not illustrated but a signetics or other LM 309K voltage regulator is quite adequate for the invention's needs.

What is claimed is:

1. A digital speedometer for use with a vehicle having an associated rotating speedometer cable with a known speedometer cable ratio comprising:
    sensing means adapted to generate an integral number of output pulses for each mile per hour of vehicle velocity comprising:
    a disk mechanically connected to and rotating with said speedometer cable, said disk having a plurality of openings regularly disposed about its perimeter;
    a housing adapted to rotatably receive said disk and to contain a light source and a light sensor responsive to said source, said sensor being positioned in the housing so said openings in said disk are between the light source and the sensor;
    a counting circuit comprising:
    a digital counter responsive to said light sensor and adapted to produce an output pulse when said sensor senses the passage of an integral number of openings in said disk,
    data transfer means for passing said output pulses to a display circuit for a preset length of time and then clearing the display; and
    a display unit responsive to said output pulses and said transfer means, said unit being adapted to accumulate and display the total of said output pulses at the end of each preset length of time.

2. A digital speedometer as in claim 1 wherein, said openings are spaced $n$ degrees apart on the perimeter of said disk, where $n$ satisfies the formulas:

$$n = \frac{\text{speedometer cable ratio}}{10}$$

and $$n = \frac{360}{I}$$

where I is an integer, said integral number is 5; and said length of time is one second.

* * * * *